United States Patent [19]

Miller

[11] Patent Number: 4,818,514

[45] Date of Patent: Apr. 4, 1989

[54] METHOD FOR RECYCLING NO IN A SYSTEM PRODUCING FERRIC SULFATE

[75] Inventor: Ralph Miller, Pleasantville, N.Y.

[73] Assignee: T-Thermal, Inc., Conshohocken, Pa.

[21] Appl. No.: 97,541

[22] Filed: Sep. 15, 1987

Related U.S. Application Data

[63] Continuation-in-part of Ser. No. 755,840, Sep. 15, 1987, Pat. No. 4,693,881.

[51] Int. Cl.$^4$ .................... C01G 41/14; C01B 17/02; C01B 21/00
[52] U.S. Cl. .................................... 423/558; 423/235; 423/573.1; 423/576.8
[58] Field of Search ................... 423/235, 235 D, 558, 423/239, 573 G, 567, 575, 573 R

[56] References Cited

U.S. PATENT DOCUMENTS

| | | | |
|---|---|---|---|
| 2,196,584 | 4/1940 | Edison | 423/558 |
| 3,847,570 | 11/1974 | Gunther | 423/242 |
| 4,693,881 | 9/1987 | Miller | 423/573 G |

FOREIGN PATENT DOCUMENTS 6815  7/1893  United Kingdom ............... 423/558

Primary Examiner—Gregory A. Heller
Attorney, Agent, or Firm—Ferrill and Logan

[57] ABSTRACT

The present invention provides a method of using air to reclaim and recycle potentially contaminating NO in a system producing ferric sulfate solution from the oxidation of ferrous sulfate and sulfuric acid in the presence of NO and oxygen. The present invention economically avoids a potentially wasteful and hazardous production of NO containing gas.

10 Claims, 1 Drawing Sheet

METHOD FOR RECYCLING NO IN A SYSTEM PRODUCING FERRIC SULFATE

The present application is a continuation-in-part of copending application Ser. No. 755,840, which will issue Sept. 15, 1987, as U.S. Pat. No. 4,693,881.

BACKGROUND OF THE INVENTION

The present invention provides an improved method of removing NO from a regenerated ferric sulfate solution formed in the presence of NO.

As is explained in the inventor's co-pending application, ferric sulfate has the ability to react with $H_2S$ to form elemental sulfur, sulfuric acid, and ferrous sulfate in the following reaction:

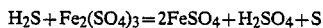

To use this reaction in a commercial operation, it is necessary to economically regenerate the ferric sulfate from the sulfuric acid and ferrous sulfate.

Although the least costly oxidant is oxygen in air, elemental oxygen is not capable of performing the regeneration. However, as the previous application explained, in the presence of NO, oxygen can accomplish this overall reaction. The effective reactions are:

(1) $2NO + O_2 = 2NO_2$

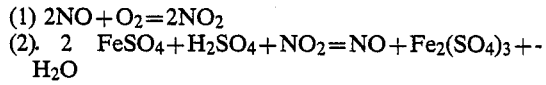

The NO formed in reaction (2) can then react with additional oxygen as shown in reaction (1).

Although it is usually advantageous to carry out the regeneration reaction at an elevated pressure to increase the rate of reaction (1), at such pressure the ferric sulfate solution, which may already contain unoxidized ferrous sulfate, will also contain dissolved NO. If the ferric sulfate solution is not substantially free from dissolved NO prior to the solution's contact with the $H_2S$ containing gas, the NO will leave the solution and contaminate the $H_2S$-free gas. This limits the potential use of such gas and wastes the NO contained therein.

Until the present invention, the seriousness and wastefulness of creating and releasing such NO contaminated gas has not been appreciated.

Accordingly, it is a primary object of the present invention to remove NO from the ferric sulfate solution and to avoid contamination of $H_2S$-free gas.

It is a further object of the present invention to recover such NO and recycle it for the further regeneration of ferric sulfate.

SUMMARY OF THE INVENTION

The present invention provides a method for removing NO from regenerated ferric sulfate solution produced by oxidizing ferrous sulfate and sulfuric acid to ferric sulfate and water.

In the present invention multiple contacting towers are employed in a substantially closed system to remove contaminating NO from ferric sulfate solution prior to its use in removing sulfur from $H_2S$ containing gas or any other potential use. Employing air as a contacting agent, NO is stripped from ferric sulfate solution and ferrous sulfate solution under reduced pressure, and then used to regenerate ferrous sulfate solution and sulfuric acid into ferric sulfate solution under elevated pressure in the manner disclosed in the inventor's co-pending application.

The present invention provides an economical method to avoid the waste and environmental risks of producing NO-containing gas by simply recycling the NO to aid in regeneration of ferric sulfate.

DETAILED DESCRIPTION OF THE INVENTION

Figure 1:
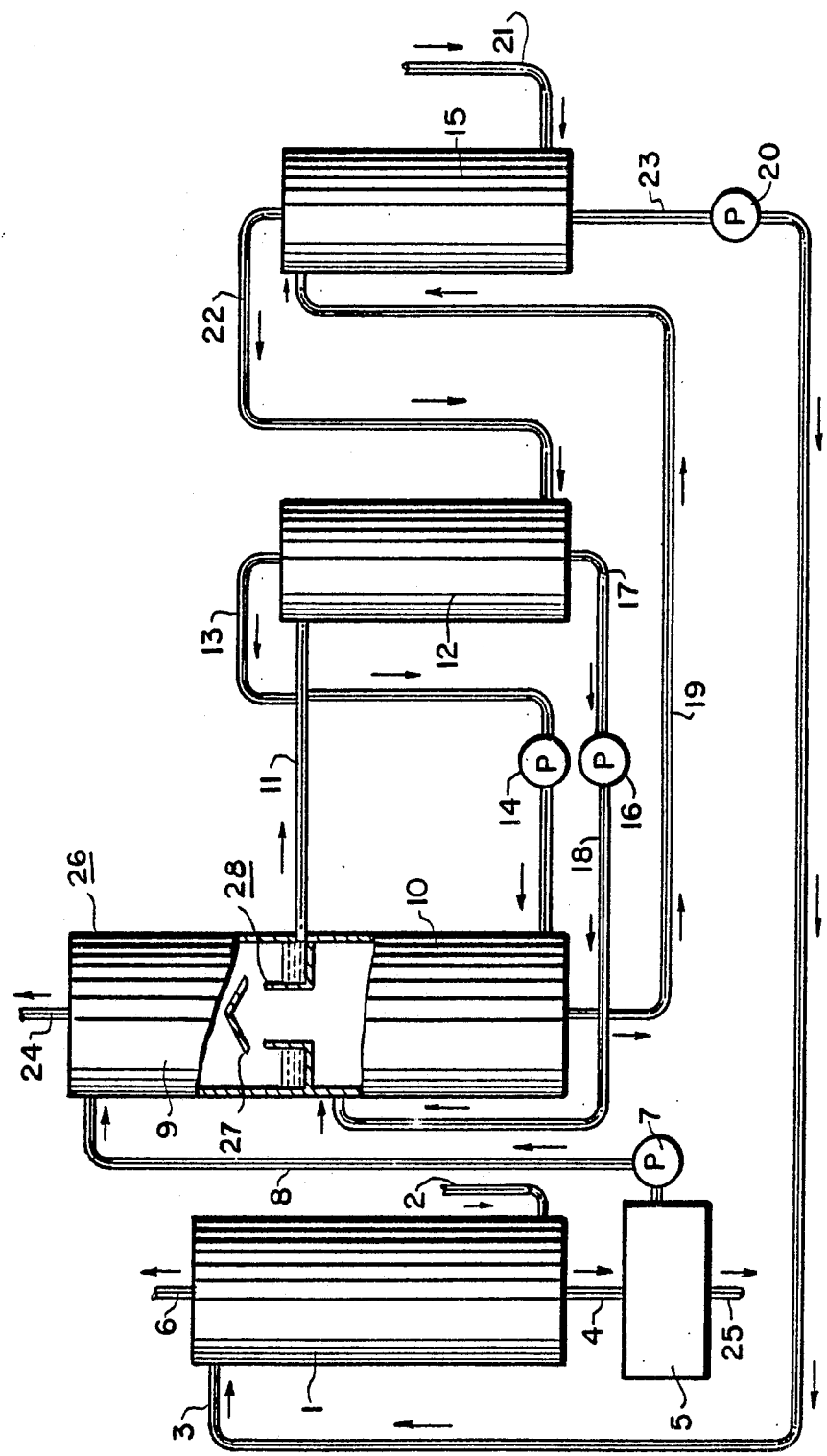
FIG. 1 is a schematic view of the system employed in practicing the present invention, showing each of the four gas-liquid contacting units employed, unit 26 shown in a partial sectional view.

The present invention employs multiple gas-liquid contactors to remove NO from a ferric sulfate containing solution.

As is shown in FIG. 1, an $H_2S$-containing gas flows into gas-liquid contactor 1 by means of line 2. As the gas moves upward it is contacted with a downward flowing ferric sulfate-containing solution which enters gas-liquid contactor 1 by means of line 3. In the contactor the $H_2S$ reacts with the ferric sulfate to form solid elemental sulfur, ferrous sulfate and sulfuric acid. The resulting slurry of solid dispersed in the aqueous solution leaves the contactor by means of its bottom liquid outlet and flows through line 4 which is connected to solid liquid separator 5. The solid-liquid separator may include any known form, including a filtration or centrifuge unit. The $H_2S$-free gas leaves contactor 1 by means of its top gas outlet to which piping 6 is connected. The $H_2S$-free gas then may be vented to the atmosphere or used for any useful purpose, including as a fuel or raw material. The recovered sulfur leaves the solid-liquid separator 5 by line 25 which leads to a sulfur storage facility (not shown).

The separated ferrous sulfate containing solution enters a suction inlet of pump 7 and is transfered by means of line 8 to gas-liquid contactor 26. Contactor 26 comprises upper zone 9 and lower zone 10 connected by means of a top hat arrangement 27 and annulus 28. Line 8 enters zone 9 through a top liquid inlet.

Preferably zones 9 and 10 are maintained at an elevated pressure. Conventionally such units are maintained at a pressure anywhere between 50 and 150 psig. Although pressure is not believed to be critical, zones 9 and 10 may be conveniently maintained at a pressure of 100 psig. The pressure may vary between somewhat above atmospheric pressure to in excess of 150 psig.

In zone 9 the downward flowing ferrous sulfate-containing solution counter-currently contacts a gas mixture comprising primarily nitrogen and NO. As the solution travels downward it absorbs an increasing amount of the NO so that at the bottom of the zone the exiting solution contains substantially all the NO contained in the entering gas. The ferrous sulfate solution containing dissolved NO leaves zone 9 through an outlet of the annulus 28 and flows by means of line 11 into a top liquid inlet of gas-liquid contactor 12. Gas-liquid contactor 12 operates at a pressure preferably much below the pressure in zone 9. The pressure in contactor 12 is preferably slightly below atmospheric pressure and must be maintained at a pressure sufficient to cause gas to pass through contactors 12 and 15.

As the solution in contactor 12 flows downward it is counter-currently contacted with upward flowing air containing a small amount of NO. At the pressure in contactor 12 the upward flowing air strips the bulk of the NO from the ferrous sulfate solution. The resulting gas mixture leaves through a top gas outlet of contactor 12 and flows by means of line 13 into a suction inlet of compressor 14. Compressor 14 supplies the energy to cause the air to enter and flow upward in both contactor 12 and contactor 15.

Compressor 14 delivers the air-NO mixture to zone 10 in which the ferrous sulfate is oxidized to ferric sulfate by the oxygen in the air supply, using as an intermediary oxygen-carrier NO. Zone 10 is proportioned so that the gas flow in it is relatively slow and that substantially all of the oxygen has reacted by the stage the gas mixture leaves zone 10 and enters zone 9.

The liquid feed to zone 10 is the ferrous sulfate solution from which the bulk of the NO was stripped in gas-liquid contactor 12. The solution leaving the bottom outlet of gas-liquid contactor 12 flows in pipe 17 into a suction inlet of pump 16. The discharge from pump 16 is at a sufficiently high pressure so that the solution flows through pipe 18 into a top liquid inlet of zone 10.

The solution reaching the bottom liquid outlet of zone 10 contain mostly ferric sulfate with a minimum of ferrous sulfate. As a result of the elevated pressure in zone 10 and the likely presence of some dissolved ferrous sulfate, the solution leaving zone 10 will contain some dissolved NO. It is undesirable for this solution containing some dissolved NO to be brought into contact with the $H_2S$-containing gas. The gas would strip some of this NO from the solution thereby contaminating it. To prevent this, the solution leaving zone 10 through its bottom liquid outlet flows through pipe 19 into a top liquid inlet of gas-liquid contactor 15. Gas-liquid contactor 15 should be at a pressure somewhat below atmospheric. The lower its operating pressure the better since the function of gas-liquid contactor 15 is to enable NO to be stripped from the ferric sulfate solution formed in zone 10. Generally contactor 15 will be maintained at a pressure some 5 psig below atmospheric. Air is drawn into a lower gas inlet of contactor 15 through pipe 21. As the air travels upward it countercurrently contacts the ferric sulfate solution moving downward. The operation is controlled so that the ferric sulfate solution leaving the bottom outlet of contactor 15 is substantially free of NO.

The stripped NO mixed with the incoming air leaves contactor 15 through its upper gas outlet to which pipe 22 is connected. By means of pipe 22 the air including its NO content is fed to gas-liquid contactor 12.

The regenerated ferric sulfate solution flows out of the bottom liquid outlet of contactor 15 through pipe 23 to a suction inlet of pump 20. Pump 20 delivers the ferric sulfate solution by means of piping 3 to the upper liquid inlet of contactor 1 at the pressure at which contactor 1 operates. This pressure is determined by the pressure at which the $H_2S$-containing gas is delivered to contactor 1.

The air supply to the regeneration portion of the process also acts as a stripping agent. As described above, the air flows in sequence through gas-liquid contactors 15 and 12, in which it strips NO, then through zone 10 in which the regeneration of the ferric sulfate is accomplished and the oxygen is consumed. The air then travels through zone 9 in which the NO is absorbed by the ferrous sulfate solution and the remaining gas, comprising primarily nitrogen, is vented to the atmosphere through pipe 24 connected to an upper gas outlet of zone 9.

The velocity of the gas flowing through the regeneration cycle is controlled so that the NO stripping and absorption is preferably accomplished at the highest feasible velocity at which these mass transfer operations may be completed. At this velocity the equipment size is a minimum for a given capacity. This usually results in the mimimum required capital investment.

In zone 10 in which the regeneration reaction takes place the overall velocity of the oxidation of ferrous sulfate to ferric sulfate is determined by the rate at which the oxygen and nitric oxide react to form nitrogen dioxide. This reaction is the slowest reaction of the series of reactions which take place in the regeneration of the ferric sulfate. The effect of temperature, pressure and composition of the gas on the rate of this reaction is well known.

It should be noted that the regenerated NO-free ferrous sulfate solution produced using the present invention may be used as a selective oxide for the conversion of $H_2S$ to sulfur, as explained above, or for any other useful purpose, such as the oxidation of hydrogen iodide to elemental iodine.

While particular embodiments of the present invention have been disclosed herein, it is not intended to limit the invention to such disclosures, and changes and modifications may be incorporated and embodied within the scope of the following claims.

What is claimed is:

1. A method of producing ferric sulfate containing solution substantially free of NO which comprises
   (a) oxidizing ferrous sulfate and sulfuric acid with an initial oxygen containing gas mixture to which NO has been added to form a ferric sulfate containing solution in which NO is dissolved and a gas mixture of reduced oxygen content containing NO;
   (b) separating the gas mixture of reduced oxygen content containing NO from the solution formed in step (a);
   (c) contacting the ferric sulfate containing solution in which NO is dissolved with a gas mixture similar in composition to said initial oxygen containing gas mixture to strip the dissolved NO from said ferric sulfate containing solution and to transfer the NO to said initial oxygen containing gas mixture;
   (d) employing means to separate NO from the gas mixture of reduced oxygen content of step (b) and transferring said NO to the gas mixture produced in step (c); and
   (e) employing in step (a) the gas mixture produced in step (d).

2. The method in accordance with claim 1 wherein prior to oxidation, the ferrous sulfate is contained in a solution in which NO is dissolved, and prior to being employed to produce ferric sulfate, the initial gas mixture and NO are contacted with said ferrous sulfate solution containing NO, stripping dissolved NO from the ferrous sulfate containing solution and transferring additional NO to said initial gas mixture.

3. The method in accordance with claim 2 wherein said contacting is accomplished at a reduced presure.

4. The method in accordance with claim 1 wherein the initial gas mixture and NO is compressed prior to being contacted with the ferrous sulfate and sulfuric acid.

5. The method in accordance with claim 1 wherein the ferric sulfate solution substantially free of NO is contacted with $H_2S$ containing gas producing a gas substantially free of $H_2S$ and a slurry of elemental sulfur, ferrous sulfate and sulfuric acid.

6. The method is accordance with claim 5 wherein a ferrous sulfate solution is separated from the slurry; and the ferrous sulfate solution is contacted with a gas containing nitrogen and NO, stripping NO from the gas and dissolving the NO in the ferrous sulfate solution.

7. The method in accordance with claim 6 wherein the ferrous sulfate solution is contacted with the gas containing nitrogen and NO under an elevated pressure.

8. The method is accordance with claim 6 wherein the ferrous sulfate solution in which NO is dissolved is contacted with the initial gas mixture and NO, stripping dissolved NO from the ferrous sulfate solution and transferring the additional NO to said gas mixture.

9. The method in accordance with claim 8 wherein said contacting with the initial gas mixture and NO is accomplished at a reduced pressure.

10. The method in accordance with claim 9 wheren said reduced pressure is between atmospheric pressure and a pressure at which flow between contactors can no longer be maintained.

* * * * *